United States Patent
Alig

(10) Patent No.: US 11,851,296 B2
(45) Date of Patent: Dec. 26, 2023

(54) SELF-ROTATING GRAIN SPREADER FOR A GRAIN BIN

(71) Applicant: David Dale Alig, Portland, IN (US)

(72) Inventor: David Dale Alig, Portland, IN (US)

( * ) Notice: Subject to any disclaimer, the term of this patent is extended or adjusted under 35 U.S.C. 154(b) by 29 days.

(21) Appl. No.: 17/473,399

(22) Filed: Sep. 13, 2021

(65) Prior Publication Data
US 2021/0403257 A1 Dec. 30, 2021

Related U.S. Application Data

(63) Continuation-in-part of application No. 29/725,851, filed on Feb. 27, 2020, now Pat. No. Des. 931,340.

(51) Int. Cl.
*B65G 69/04* (2006.01)

(52) U.S. Cl.
CPC ..... *B65G 69/0441* (2013.01); *B65G 69/0458* (2013.01); *B65G 2814/027* (2013.01); *B65G 2814/0282* (2013.01)

(58) Field of Classification Search
CPC ............ B65G 69/0441; B65G 69/0458; B65G 2814/027; B65G 2814/0282
USPC ......... 239/666, 687; 414/195, 206, 299, 301
See application file for complete search history.

(56) References Cited

U.S. PATENT DOCUMENTS

| | | |
|---|---|---|
| 1,793,032 A | 2/1931 | Welker |
| 3,248,117 A * | 4/1966 | Donelson, Jr. ......... B65G 69/00 414/301 |
| 3,445,091 A | 5/1969 | Jackson |
| 3,868,028 A | 2/1975 | Mausser |
| 4,040,529 A | 8/1977 | Wurdeman et al. |
| 4,216,914 A * | 8/1980 | O'Hanlon .......... B65G 69/0458 414/301 |
| 4,272,028 A | 6/1981 | Cobb |
| 4,555,210 A * | 11/1985 | Wigram ............. B65G 69/0458 414/301 |
| 4,611,965 A | 9/1986 | Dixon et al. |
| 4,902,185 A | 2/1990 | Dixon et al. |
| 5,020,701 A | 6/1991 | Donelson |
| 5,372,467 A | 12/1994 | Harris |
| 5,421,379 A * | 6/1995 | Geiser ................ B65G 69/0458 414/299 |
| 5,393,189 A | 12/1995 | Berquist |
| 5,570,954 A | 11/1996 | Sukup |
| 5,755,837 A * | 5/1998 | Beierle .................. C10B 53/02 414/301 |
| 6,591,972 B1 * | 7/2003 | Forrest ............... B65G 69/0441 193/29 |
| 6,991,415 B1 | 1/2006 | Anschultz |
| 7,931,432 B2 | 4/2011 | Hershberger |
| 7,946,796 B2 | 5/2011 | Halland et al. |

(Continued)

*Primary Examiner* — James Keenan
(74) *Attorney, Agent, or Firm* — Jacox, Meckstroth & Jenkins

(57) ABSTRACT

A grain bin has a top opening with a hopper for receiving grain that is directed downwardly to a spreader supported for rotation by a vertical shaft. The spreader has an elongated inclined chute having a V-shape cross-section. The chute has a center portion having an opening with a trap door pivoted or controlled from a mechanism operable from the top opening of the bin. A deflector is positioned under the trap door opening and rotates the chute in response to the flow of grain through the opening. The chute has an extension that also supports a pivotal deflector.

4 Claims, 4 Drawing Sheets

(56) References Cited

U.S. PATENT DOCUMENTS

| | | | |
|---|---|---|---|
| 10,889,455 B1 | 1/2021 | Agnew et al. | |
| 2004/0046071 A1 | 3/2004 | Shivvers | |
| 2006/0072989 A1 | 4/2006 | Kaeb et al. | |
| 2008/0219817 A1 | 9/2008 | Halland et al. | |
| 2009/0324372 A1 | 12/2009 | Hershberger | |
| 2010/0239399 A1 | 9/2010 | Hoogestraat et al. | |
| 2012/0205007 A1* | 8/2012 | Girard | B65G 69/0458 141/387 |
| 2014/0165854 A1 | 6/2014 | Green et al. | |
| 2015/0196883 A1 | 7/2015 | Jensen | |
| 2016/0038894 A1 | 2/2016 | Jensen et al. | |
| 2018/0128356 A1 | 5/2018 | Koehler et al. | |
| 2019/0291980 A1 | 9/2019 | Honeck et al. | |
| 2020/0263923 A1 | 8/2020 | Bloemendaal | |
| 2020/0396903 A1 | 12/2020 | Kosior et al. | |
| 2021/0107752 A1* | 4/2021 | Martin | B65G 69/0441 |

* cited by examiner

SELF-ROTATING GRAIN SPREADER FOR A GRAIN BIN

RELATED APPLICATION

This application is a continuation-in-part of design patent application Ser. No. 29/725,851, filed Feb. 27, 2020 and claims the benefit of the disclosure and filing date of that application.

BACKGROUND OF THE INVENTION

The present invention relates to a self-rotating grain spreader for mounting with the upper portion of a grain bin having a top opening for receiving grain. The grain is commonly delivered to the top opening by an inclined power driven conveyor for distributing or spreading the grain over the entire area of the grain bin. The spreader may have one or more distributing chutes and supported for rotation by a vertical center shaft which supports the spreader for rotation within an upper portion of the grain bin. The chute is inclined downwardly and has deflectors which cause the spreader to rotate in response to the flow of grain from the top opening into the spreader, for example, as this disclosed in U.S. Pat. No. 7,931,432.

It is very desirable for the spreader to handle variable flow rates of grain into the top opening of the grain bin and to handle different types of grains and grains of different sizes and different moisture content. It is also desirable to control the rotation of the grain spreader in response to the flow of grain into the top opening of the grain bin in order to control the deposit or spreading of grain uniformally around the entire top surface of the grain within the bin.

DESCRIPTION OF THE PREFERRED EMBODIMENT

Figure 1:
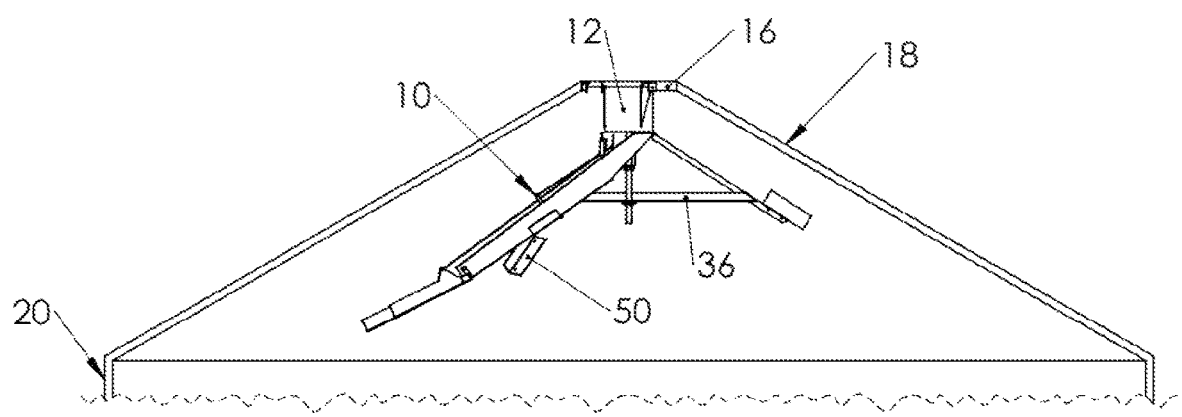
FIG. 1 is an elevational side view of a self-rotating grain spreader for a grain bin and constructed in accordance with the invention.
Figure 2:
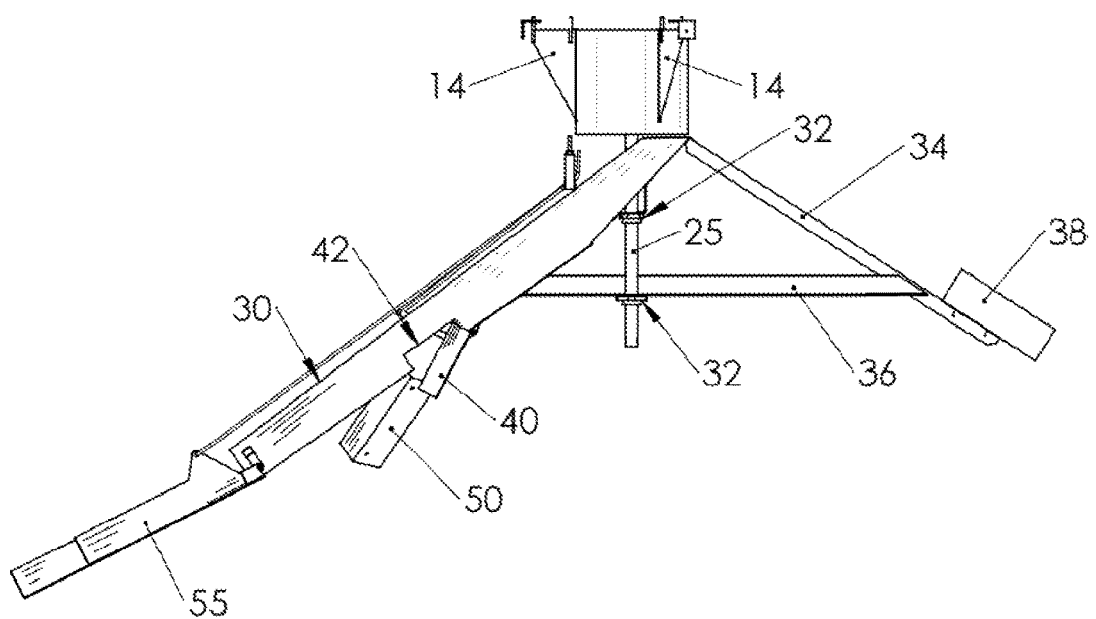
FIG. 2 is an enlarged side view of the spreader shown in FIG. 1, the opposite side view being a mirror image.
Figure 3:
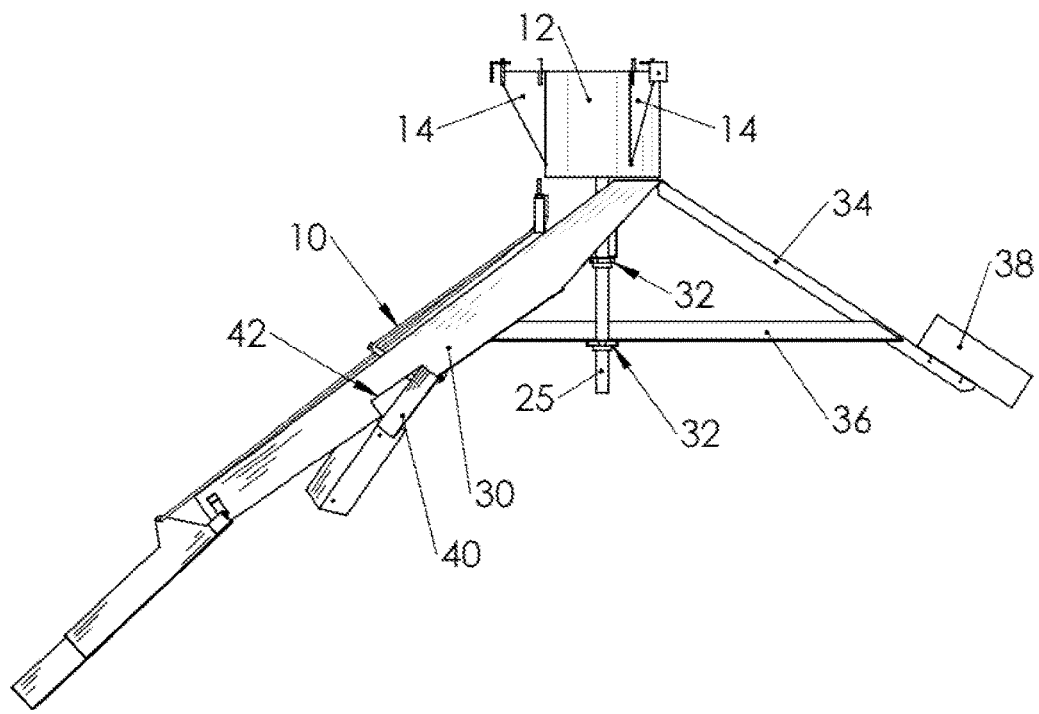
FIG. 3 is a side view thereof after a trap door and lower end portion of the chute have been lowered.

The self-rotating grain spreader 10 is constructed in accordance with an embodiment of the invention and provides all of the features mentioned above and is economical in construction and simple to install within the upper portion of a grain bin, through the top opening of the bin. The self-rotating grain spreader 10 includes an annular or cylindrical hopper 12 which is supported by brackets 14 connected to the top inlet portion 16 of an inclined top wall 18 of a grain bin 20. The hopper 12 supports a downwardly projecting center shaft 25 having a vertical axis and which is non-rotatable. The shaft 25 projects downwardly from the hopper 12 and supports an elongated and inclined primary chute 30 having an upper end portion positioned to receive grain from the hopper 12. The chute extends downwardly at an angle of about 45 degrees relative to the center shaft 25 and is supported for rotation by vertically spaced bearings 32 mounted on the center shaft 25.

The primary chute 30 is supported on the incline by counter balancing arms 34 & 36 also supported by bearings 32 for rotation with the primary chute, and the arms carry a weight member 38. The primary grain chute 30 has a substantially V-shape cross-sectional configuration and extends upwardly to receive the grain supplied to the hopper 12 so that the grain slides downwardly within the primary chute to an outlet at the lower end of the chute.

A trap door 40 is supported for pivotal movement within a central portion of the primary chute and is pivotal between a closed position for an opening 42 within the bottom side portion of the chute to an open position to allow some of the grain sliding down the chute to flow out the bottom of the chute. The trap door 40 is operable or pivots by a mechanism 45 that has an element 46 connected by a lever 47 to the trap door, and the mechanism 45 can be adjusted or controlled from inside the hopper 12.

A grain deflector 50 is supported by the primary chute 30 and is positioned to rotate the chute 30 on the axis of the center shaft in response to the downward flow of grain through the trap door opening 42. Thus the rotation of the primary chute 30 is controlled by the flow of grain through the trap door opening 42. Thus the extent of the open position of the trap door controls the degree of rotation of the primary chute 30.

Figure 4:
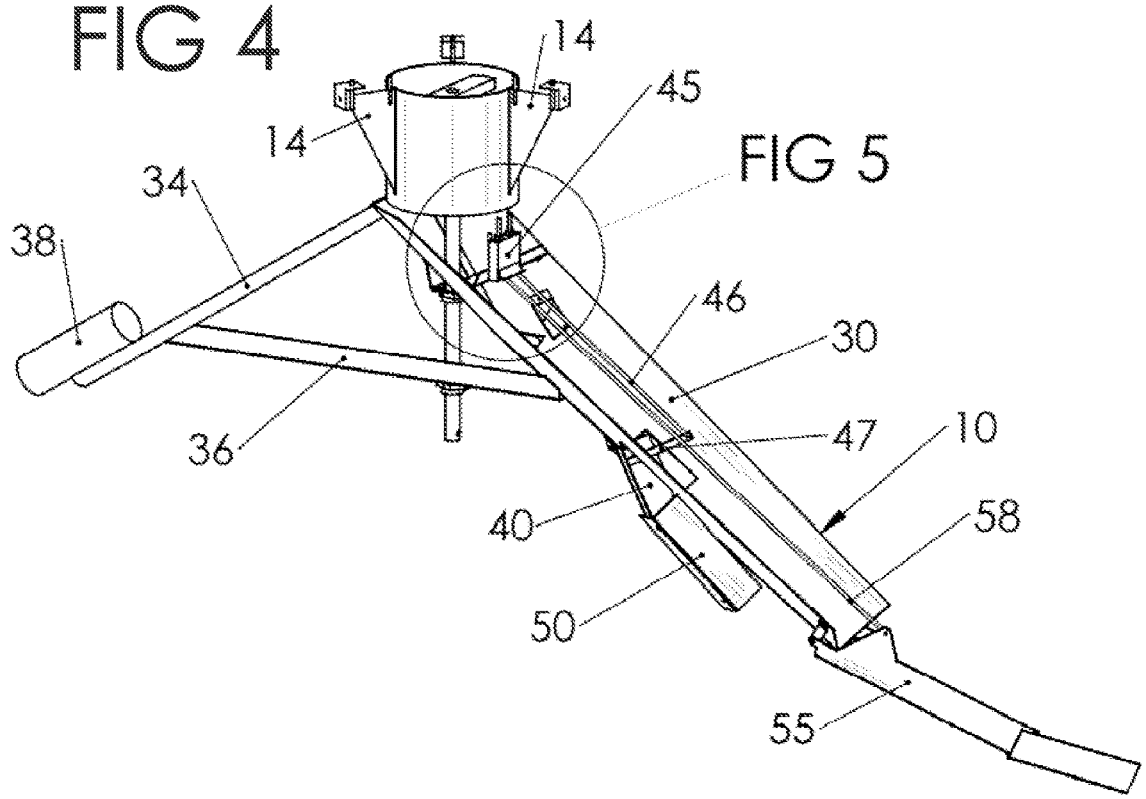
FIG. 4 is a perspective view of the primary chute and chute member and showing the adjustment mechanism for the trap door and lower chute member.
Figure 5:
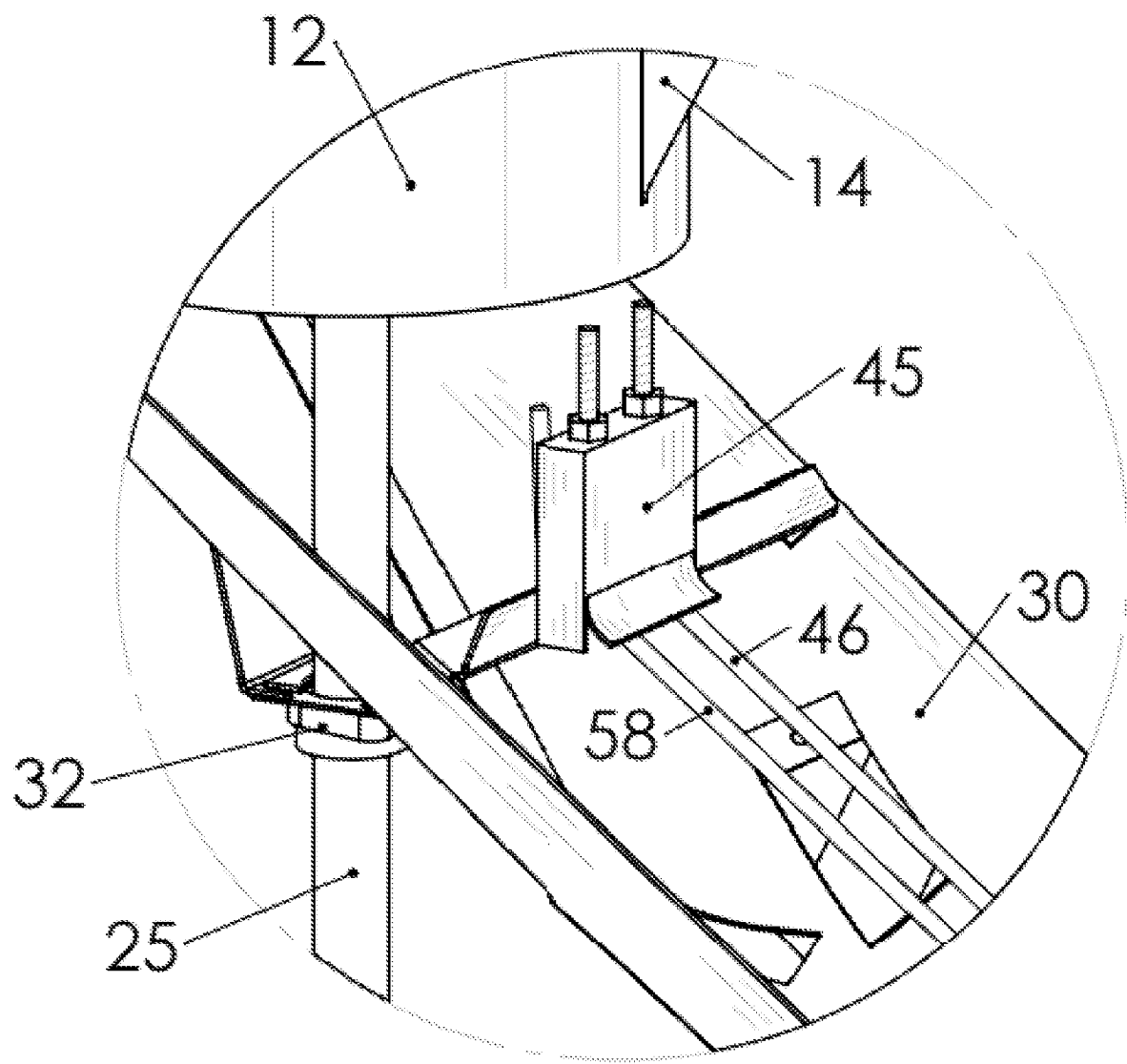
FIG. 5 is an enlarged view of the adjustment members shown in FIG. 4.
Figure 6:
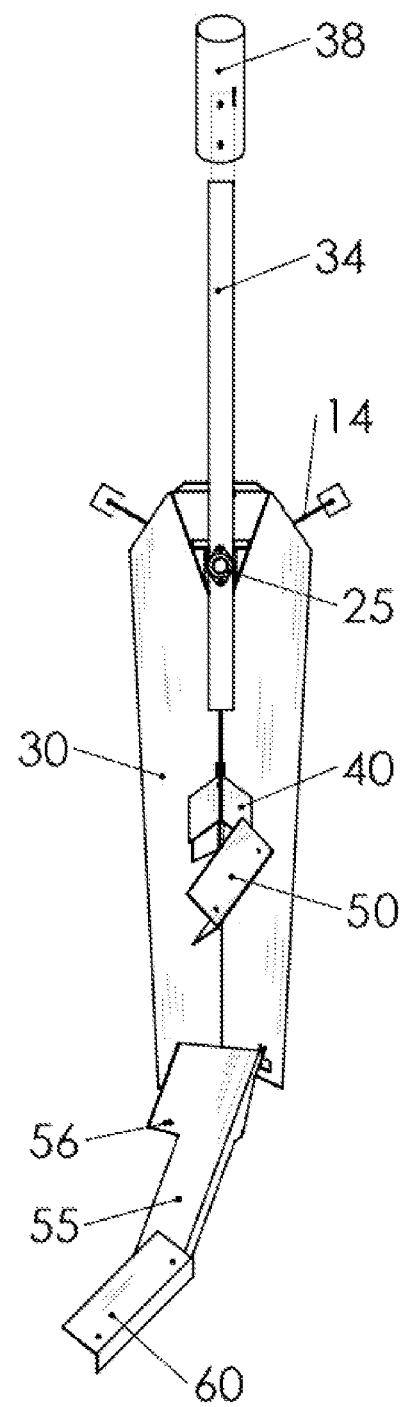
FIG. 6 is a bottom view of the primary chute and lower chute member.

As shown in FIGS. 4 and 6, the lower end portion of the primary chute 30 pivotally supports a lower chute member 55 for pivoting on a pin 56 and is substantially flat as shown in FIG. 6. The lower chute member 55 is pivoted by a rod 58 extending from the adjusting mechanism 45 which also controls the pivotal movement of the trap door 40. The lower chute member 55 has an adjustable deflector member 60 which extends at an angle to assist the rotation of the primary chute 30.

From the drawings and the above description, it is apparent that a self-rotating grain spreader constructed in accordance with the invention provides the desirable features and advantages referred to above. While the specific structure of the grain spreader constitutes a preferred embodiment of the invention, it is to be understood that the invention is not limited to the specific structure disclosed, and that changes may be made therein without departing from the scope of the invention as defined in the dependent claims.

What is claimed is:

1. A self-rotating grain spreader for mounting within the upper portion of a grain bin having a top opening for receiving grain, the spreader comprising a hopper adapted to be connected to the upper portion of the grain bin for directing the grain downwardly into the bin, a substantially vertical shaft supported by the hopper for non-rotation and projecting downwardly from the hopper, an inclined primary chute supported by the shaft for rotation within the upper portion of the grain bin, the primary chute having an upwardly facing V-shape cross-sectional configuration and positioned to receive grain from the hopper to produce a flow of grain downwardly within the chute, a trap door within a bottom portion of the primary chute and moveable from a closed position for an opening in the primary chute to an open position to provide a downward flow of a portion of the grain sliding down the primary chute, a grain deflector supported by the primary chute and positioned to rotate the primary chute on an axis of the shaft in response to the downward flow of the portion of the grain, the trap door being adjustable from outside the hopper to control the flow of grain through the opening and thereby control the rotation of the primary chute, a mechanism operable from outside the hopper and rotatable with the primary chute for pivoting the trap door to control the flow of grain through the opening, and the mechanism includes an elongated element pivotally connected by a lever to the trap door.

2. A grain spreader of claim 1 wherein only one primary chute is supported for rotation by the shaft.

3. The grain spreader of claim 1 wherein the inclined primary chute extends downwardly about 45 degrees relative to the shaft.

4. A self-rotating grain spreader for mounting within the upper portion of a grain bin having a top opening for receiving grain, the spreader comprising a hopper adapted to be connected to the upper portion of the grain bin for directing the grain downwardly into the bin, a substantially vertical shaft supported by the hopper for non-rotation and projecting downwardly from the hopper, an inclined primary chute supported by the shaft for rotation within the upper portion of the grain bin, the primary chute having an upwardly facing V-shape cross-sectional configuration and positioned to receive grain from the hopper to produce a flow of grain downwardly within the chute, a trap door within a bottom portion of the primary chute and moveable from a closed position for an opening in the primary chute to an open position to provide a downward flow of a portion of the grain sliding down the primary chute, a grain deflector supported by the primary chute and positioned to rotate the primary chute on an axis of the shaft in response to the downward flow of the portion of the grain, the trap door being adjustable from outside the hopper to control the flow of grain through the opening and thereby control the rotation of the primary chute, and including a lower chute member pivotally connected to a lower portion of the primary chute, and a grain deflector connected to the lower chute member.

\* \* \* \* \*